United States Patent Office 2,794,689
Patented June 4, 1957

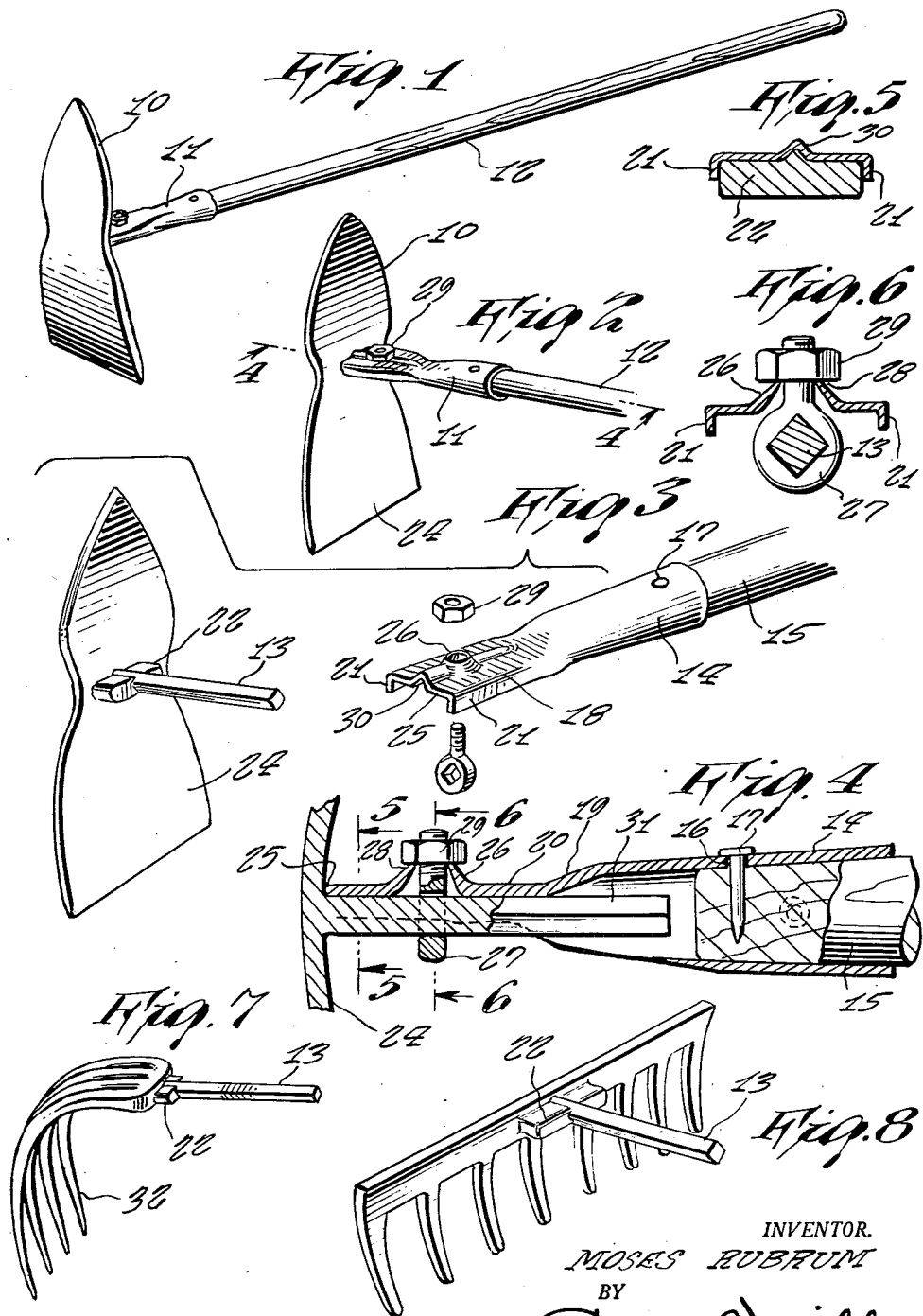

2,794,689

HANDLE FASTENING FOR GARDEN TOOL

Moses Rubrum, Brooklyn, N. Y.

Application June 20, 1955, Serial No. 516,439

1 Claim. (Cl. 306—24)

This invention relates to improvements in fittings for securing garden tool heads to an operating handle.

According to the instant invention a novel fitting is provided which is adapted to mount removably the various species of earth cultivating tool heads upon a conventional handle or stick. One end of this fitting includes a sleeve which receives the operating end of a handle; a nail or screw being used to lock the fitting to the handle. The other end of the fitting includes special coupling means adapted to coact with identical stub shanks projecting from each of a set of garden implements whereby the implements such as a hoe, rake, etc. can be removably secured to the fitting. The coupling means is designed to provide a rigid, sturdy connection enabling the user to subject the assembled tool to the stresses encountered in tilling the earth.

Consequently a complete set of garden tools are made available through the provision of a set of tool heads and a handle including the special fitting.

By eliminating the usual integrally connected handle accompanying each tool, the tool heads can be compactly stored for transportation and the additional expense for shipping the handles separately is avoided.

Consequently the object of this invention is the provision of a sturdy, inexpensive fitting adapted for removably mounting each of a set of earth cultivating tool heads upon a conventional operating handle or stick.

A further object of this invention is the provision of a set of garden or earth working tools each adapted to be removably but rigidly connected to a novel fitting which in turn is designed for rapid operative attachment to an operating handle or stick.

A still further more specific object of this invention is the provision of a fitting, one end of which is adapted for mounting on an end of an operating handle and the other end of which can be removably coupled to each of a set of garden implements.

A still further specific inventive object is the combination of a set of tool heads each of which includes stub shanks adapted for reception within a channel comprising an end of a special fitting including a threaded eye bolt adapted to lock the tool head shanks within the channel and wherein the fitting includes a sleeve for snugly receiving the end of an operating handle for mounting purposes.

Further objects and inventive details will become more apparent from the following detailed description when read in conjunction with the attached drawings in which:

Figure 1 is a perspective view of an assembled tool including one of a set of tool heads, the novel fitting and the handle.

Figure 2 is a perspective view of the tool head end of the assembly showing more specifically details of the mounting means.

Figure 3 is an exploded perspective of the assembly components including a tool head, the fitting mounted on a handle and the eye bolt for attaching the tool head to the fitting.

Figure 4 is an axial sectional view of the assembly shown in Figure 2.

Figure 5 is a transverse section thru plane 5—5 of Figure 4 showing the relationship between the tool head shank and the fitting mounting channel.

Figure 6 is a transverse section thru plane 6—6 of Figure 4 showing the function of the eye-bolt in locking tool shank to the fitting.

Figure 7 is a perspective view of a species of tool head.

Figure 8 is a similar view of another form of tool head.

Referring to Figures 1 and 2 an operative assembly of a garden tool utilizing the instant invention is seen to comprise a tool head 10 secured removably to the novel fitting 11 which in turn is securely mounted upon a handle 12. As is seen in Figures 3, 7 and 8 each of the various tool heads depicted includes an identical stub shank 13 which is adapted, in a manner to be disclosed, for removable connection with the fitting 11.

The special fitting 11 comprises a tapered sleeve 14 at one end adapted to receive a wedge-shaped end 15 of the handle 10 which is forced firmly into the sleeve. A hole 16 is provided thru the sleeve wall for a nail, screw or the like 17 which is driven into the handle material. At the opposite end of the fitting 11 there is provided a channel-like adaptor 18 which is connected to the sleeve 14 by a transition section 19. The adaptor includes a substantially planar web 20 and parallel transverse end flanges 21 creating a shallow trough-like enclosure adapted to fit snugly about a rectangular abutment 22 projecting from the inner surfaces 23 of each of the tool heads, as, for example, 24 of Figure 3. When the fitting is secured to a tool head the outer end 25 of the adaptor 18 abuts the tool head surface 24. Approximately midway between the transition section 19 and the end 25 there is provided an apertured boss 26 adapted to receive therethrough an eye-bolt 27. The rim 28 of the boss functions as an abutment for a nut 29 which threadedly engages the threaded shank of the bolt 27, whereby the eye-bolt can be adjustably mounted on the adaptor. The web 25 includes a triangular ridge 30 which extends axially along the web centerline providing a retaining groove adapted to receive a complementary edge 31 of each of the tool head shanks 13.

An operative assembly is made by firstly mounting the handle end 15 within the sleeve 14 as shown in Figure 4. Secondly a tool head shank 13 is inserted into the adaptor 18 with the edge 31 received within the notch of ridge 30. The eye-bolt 27 is adjusted to axially align with the shank 13 and the shank is then projected through the eye-bolt until the adaptor end 25 abuts the surface 24 of the tool head and the abutment 22 is received within the flanges 21 of the adaptor. The nut 29 is then tightened to firmly lock the tool head and adaptor into an integral unit. It should be noted that the flanges 21 restrain the abutment 22 of the tool head from lateral relative movement. Due to the retaining pressure exerted by the eye-bolt against the shank 13, frictional forces are generated between the shank edge 31 and the ridge 30 preventing relative axial displacement. Moreover additional retaining forces result from the interaction of the end 25 with the tool head 24. Consequently an exceedingly sturdy connection is effected between the tool head and the fitting.

The aperture through the eye-bolt is of similar section as the stub shank 13. For example in Figure 3, the shank and the eye-bolt aperture are both square. Obviously other stub shank sections can be provided.

To change tool heads, the operator merely loosens the nut 29, slides the head axially from the fitting and inserts the shank of one of the other tool head forms. Thus a large variety of tools can be provided as desired.

In Figure 7 a fork-type head 32 is illustrated and in Figure 8 a rake.

Each of the tool head varieties is provided with the identical abutment 22 and shank 13 structure described in connection with the hoe of Figure 3.

A large set of tool heads can be stored or packed in a small space or portable tool chest greatly facilitating the convenient availability of any particular tool form required.

Although steel is preferred for fabricating purposes other suitable materials may be employed.

The embodiments depicted are preferred inventive forms, however other modifications resulting from changes in size, shape, material, arrangement, etc. within the purview of a skilled artisan are to be regarded as falling within the scope of the invention.

Having described in detail the nature of the invention, a grant of Letters Patent is desired for the novel improvements herein disclosed and as defined in the following claim:

A fitting comprising a sleeve and an adaptor integrally connected with a transition section, said sleeve including a tapered socket for receiving in wedgelike fashion the end of a handle, said adaptor including an open longitudinal channel section aligned with the socket, said adaptor being further provided with a longitudinal extending notch in the bottom wall of the channel section, an opening in the bottom wall of the channel section, an eye-bolt adjustably mounted in the opening through the wall of the channel section, a tool head having an axial stub shank of rectangular cross section received in the channel section and passing through the eye of the eye-bolt with an edge of the shank received in the notch, and means to adjust the eye-bolt to apply bearing pressure between the channel section and the shank of the tool.

References Cited in the file of this patent
UNITED STATES PATENTS

| | | |
|---|---|---|
| 709,603 | Larsen | Sept. 23, 1902 |
| 870,678 | Hansen | Nov. 12, 1907 |
| 1,111,950 | Cooley et al. | Sept. 29, 1914 |